United States Patent Office 2,890,203
Patented June 9, 1959

2,890,203

ALKALI SOLUBLE RESINS AND COMPOSITIONS CONTAINING THE SAME

Sylvan O. Greenlee, Racine, Wis., assignor to S. C. Johnson & Son, Inc., Racine, Wis.

No Drawing. Application January 12, 1954
Serial No. 403,645

8 Claims. (Cl. 260—47)

This invention relates to synthetic resins and compositions containing the same. More particularly, it relates to alkali soluble resins suitable for use in removable protective coating compositions.

The resins of this invention in regulated proportions are useful in the manufacture of paints, varnishes, adhesives, fabric-treating compositions, etc. Moreover, they are particularly well-suited for use in removable protective coating compositions.

In addition to wax, the use of minor amounts of resins in self-polishing non-permanent type coating compositions has been appreciated for many years. It has been found, however, that in order to obtain a composition which upon application would produce a film having maximum gloss and hardness, a resin must constitute a major proportion of the solids content of the composition. Resins suitable for use in major amounts in such compositions must have certain peculiar properties. Since nearly all the self-polishing floor coating compositions are water emulsions or dispersions, the resin must be readily dispersible in water as well as being compatible with the other components of the formulation. The resin must impart to the formulation good flow characteristics and result in a film having high gloss as well as water and mar resistance. The water resistance of the film resulting from the application of the formulation should be sufficient to allow damp mopping with cold or tepid water and yet not resistant to such a degree as to prevent its removal with hot water and soap or detergents. Finally, the resin should not result in a film which is tacky or slippery.

Heretofore, most resins have been prepared specifically for the paint and varnish, or plastics industries. These resins are necessarily of a high molecular weight and have a high water resistance, making them difficult, if not impossible, to disperse in aqueous media in the formulation of removable coatings. Certain naturally occurring resins have some desirable characteristics for incorporation in removable protective coating compositions, but are not completely satisfactory and are often difficult to obtain.

In accordance with this invention, a new resin has been discovered which possesses all the desirable properties previously mentioned and which is less expensive than the naturally occurring resins used heretofore. These resins are prepared by reacting in the presence of alkali, a dihydric phenol with a coupling agent having two functional groups which readily form ether linkages with phenolic hydroxyl groups. The amount of dihydric phenol used is in excess of the equivalent amount of the coupling agent so as to provide unreacted phenolic hydroxyl groups in the product. A part of the unreacted phenolic hydroxyl groups are then etherified in the presence of alkali with a carboxylic acid. The final product is thus an aryloxy acid containing a plurality of ether oxygens and conforming to the general formula:

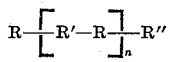

in which R is the residue of a dihydric phenol, R' represents the residue of an aliphatic coupling agent, R" constitutes the carboxyl-supplying radical, and $n$ is an integer of from 1 to 3.

The dihydric phenols suitable for use in making the resins of this invention may be mono-nuclear such as resorcinol, hydroquinone, catechol, etc., or poly-nuclear, such as p,p'-dihydroxy benzophenone, p,p'-dihydroxy diphenyl, p,p'-dihydroxy dibenzyl, dihydroxy anthracenes, dihydroxy naphthalenes, bis-phenols wherein the aromatic nuclei are joined by an alkyl group having from 1 to 10 carbon atoms, etc. Particularly advantageous in making the new phenoxy resins of this invention are the bis-phenols.

The coupling agents advantageously used in building up the molecular structure desired for the resinous aryloxy monoacids of this invention are bi-functional in their reactions with the dihydric phenols in the presence of alkali. Epichlorhydrin is bi-functional in such reactions in that the epoxide group and the chloride group each react with a phenolic hydroxyl group in the presence of alkali, forming ether linkages between the epichlorhydrin residue and the dihydric phenol residue. Epihalohydrins other than epichlorhydrin, such as epibromohydrin and those structures in which one of the carbon atoms is replaced by an ether oxygen such as 2,3-epoxypropyl 2-hydroxy-3-chloropropyl ether, may be used. The epihalohydrins suitable for use as coupling agents should be based on an aliphatic structure containing from 4 to 10 carbon atoms. Similarly, diepoxides containing 4 to 10 carbon atoms such as 1,2-epoxy-3,4-epoxybutane, or those in which one of the carbon atoms is replaced by an ether oxygen such as bis(2,3-epoxypropyl) ether may be used. Epoxides referred to herein are limited to those in which the oxygen bridges adjacent carbon atoms, also referred to as ethylene oxides.

The coupling agent may also be an aliphatic dihalide since these materials also react with phenolic hydroxyl groups to form ethers. Exemplary halides are 1,2-dichloroethane, 1,3-dichloropropane, 1,2-dibromoethane, 1,3-dibromopropane, 1,10-dichlorodecane, and the dihalides of corresponding olefins. It has been found that the dihalides containing 10 or less carbon atoms, as well as those in which one of the carbon atoms has been replaced by an ether oxygen, are useful in preparing resins having the above-described desirable properties.

The carboxylic acids suitable for use in the preparation of the resinous aryloxy monoacids of this invention are those which contain from 1 to 8 carbon atoms and a single functional group which is capable of reacting with phenolic hydroxyl groups to form an ether. Exemplary acids are the monohalo acids such as chloroacetic acid, 2-chloro caprylic acid, 5-bromo valeric acid, etc., and the epoxy acids of 3 to 8 carbon atoms such as glycidic acid, 6,7-epoxyheptanoic acid.

The reaction of a phenolic hydroxyl group with an alkyl halide forms an ether linkage by the well known Williamson ether synthesis:

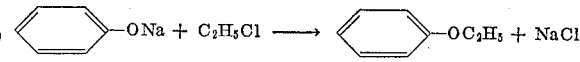

Phenol also reacts with an epoxide group to form a hydroxy ether:

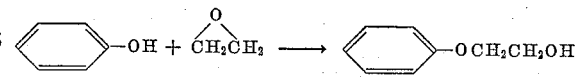

Phenol reacts with halo-acids to form aryloxyacids:

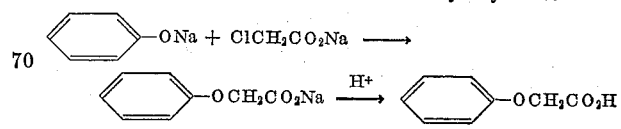

It will be seen that these three typical reactions constitute those which are used in building up the structure of resinous aryloxy monoacetic acids. For example, the successive reactions leading to a typical aryloxyacid prepared from p,p'-isopropylidenediphenol, epichlorohydrin, and chloroacetic acid are as follows:

(1st step)

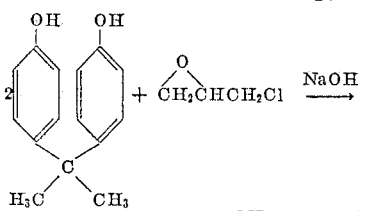

(2nd step)

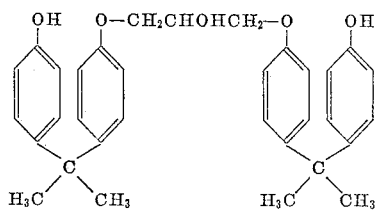

The reaction of 3 mols of p,p'-isopropylidenediphenol with 2 mols of bis(beta-chloroethyl) ether and 1 mol of chloroacetic acid would be required to give the following structure:

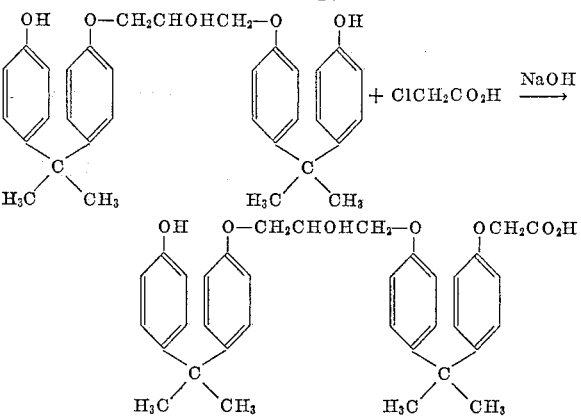

It is understood that in the illustrative reactions given above, the desired products may be obtained in predominant amounts by properly adjusting the molar proportions of materials and the reaction conditions, but the formation of products of side reactions cannot be avoided in all cases. In the preparation of the new phenoxy monoacids for use in self-polishing coating compositions, it has been found that the side reaction products are usually not present to such a degree as to be detrimental to the properties of the final coating composition. Where side products are found to be present to an appreciable extent, it is possible to separate the same in the course of preparing the resin. Such a separation is illustrated in Example II which involves the removal of the unreacted p,p'-isopropylidenediphenol after its reaction with epichlorhydrin and before the addition of chloroacetic acid to form the final aryloxy monoacids. An indication of the purity of the desired phenoxy monoacid is provided by the alcoholic and phenolic hydroxyl values as well as by the acid values of the product, discussed hereinbelow.

Although in the final illustrative reaction above, the value of $n$ is 2, in the general formula for the resinous monoacids of this invention,

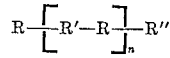

its value depends upon the reactants employed. It has been found that in resins where $n$ is greater than 3 there is insufficient solubility in alkali solutions, or the coatings prepared therefrom have an unsatisfactory balance of water resistance properties. Where the value of $n$ approaches zero, the products are unduly soluble in water and unsuitable for use in the coating compositions of this invention. Some latitude in choosing the optimum combination of ingredients is desirable. When a given performance is desired in resins which are prepared from two dihydric phenols having different chemical structures, it may be necessary to vary the ratio of ingredients to produce products having molecular weights of such values as to give the desired balance of performance characteristics. Two resinous phenoxy monoacids having the same hydrophilic properties, one based upon the use as a coupling agent of epichlorhydrin, and the other based upon the use of bis(beta-chloroethyl) ether, would not be obtained by having the same value for $n$. Since the residue of a relatively high-molecular weight diphenol such as p,p'-isopropylidenediphenol is less hydrophilic than that of hydroquinone, in preparing resins having the desired balance of characteristics, one would choose a combination of coupling agent and carboxylic acid for each, which would contribute the desired properties to the final product.

Three possible formulae for the products resulting from the reaction of p,p'-isopropylidenediphenol, epichlorhydrin, and chloroacetic acid are as follows:

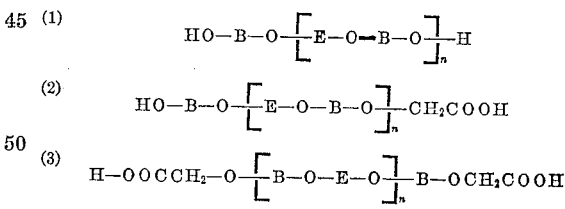

wherein E represents the epichlorhydrin residue and B represents the residue of p,p'-isopropylidenediphenol. The theoretical phenolic and alcoholic hydroxyl values and acid values for the above formulae are given in the following table:

TABLE I

| Formula | Value of $n$ | M.Wt. | No. of (OH)/mol. | | (OH) Value | | | Acid Value |
|---|---|---|---|---|---|---|---|---|
| | | | Alc. | Phen. | Alc. | Phen. | Total | |
| 1 | 0 | 228 | 0 | 2 | 0 | 492 | 492 | 0 |
| 1 | 1 | 512 | 1 | 2 | 110 | 219 | 329 | 0 |
| 1 | 2 | 796 | 2 | 2 | 141 | 141 | 282 | 0 |
| 1 | 3 | 1,080 | 3 | 2 | 156 | 104 | 260 | 0 |
| 2 | 0 | 286 | 0 | 1 | 0 | 196 | 196 | 196 |
| 2 | 1 | 570 | 1 | 1 | 98 | 98 | 196 | 98 |
| 2 | 2 | 854 | 2 | 1 | 131 | 66 | 197 | 66 |
| 2 | 3 | 1,138 | 3 | 1 | 148 | 49 | 197 | 49 |
| 3 | 0 | 344 | 0 | 0 | 0 | 0 | 0 | 326 |
| 3 | 1 | 628 | 1 | 0 | 89 | 0 | 89 | 178 |
| 3 | 2 | 912 | 2 | 0 | 123 | 0 | 123 | 123 |

The hydroxyl value as used throughout this patent description is defined as the number of milligrams of potassium hydroxide which is equivalent to the hydroxyl content of 1 gram of the sample. The method used for the determination of alcoholic and phenolic hydroxyl groups in the presence of each other is described in "Quantitative Organic Analysis Via Functional Groups," by Sidney Siggia, pp. 4–8, published by John Wiley & Sons, Inc., New York, New York (1949). The acid value as used herein is defined as the number of milligrams of potassium hydroxide which is equivalent to the acid content of 1 gram of the sample.

It has been found in the preparation of the resins of this invention that an acid number below 40, i.e., where $n$ in formula 2 is greater than 3, will usually render the resin insoluble in alkali, while in a resin having an acid number greater than 130, the value of $n$ approaches 0, giving a compound which is poor in water resistance characteristics. Compounds which have acid numbers in the above range would have phenolic hydroxyl values of from 40 to 130, and alcoholic hydroxyl values of about 60 to about 150.

The following are illustrative examples of the alkali soluble resins of this invention:

Example I

To a solution of 456 parts of p,p'-isopropylidenediphenol dissolved in 850 parts of water containing 80 parts of caustic soda was added 92.5 parts of epichlorhydrin at 70° C., and with continuous agitation the reaction mixture was raised to approximately 95° C. holding this temperature for 1 hour after addition of the epichlorhydrin. A solution of 189 parts chloroacetic acid and 160 parts caustic soda dissolved in 800 parts of water was added and the mixture held at 100° C. for 1 hour, at which time 476 parts of 37% hydrochloric acid and 500 parts of water were added and the mixture stirred for an additional hour. The aqueous layer was decanted and the product washed three times by stirring one-half hour with 200 parts of hot water, removing the water each time by decantation. The resin was dried by heating to 130° C., giving 565 parts of a product having a softening point of 77° C. (Durrans Mercury Method, Journal of Oil and Colour Chemists' Association, 12, 173–5 [1929]), and an acid value of 102.

Example II

To a solution of 456 parts of p,p'-isopropylidenediphenol dissolved in 360 parts of water containing 80 parts of caustic soda was added 92.5 parts of epichlorhydrin at 60° C., and with continuous agitation the reaction temperature was raised to 95–100° C. and held for 1 hour after all of the epichlorhydrin had been added. To the reaction mixture was added 500 parts of boiling water, the mixture stirred for about 10 minutes, and the water layer removed by decantation. This water washing was repeated twice, saving the washings which were later neutralized with acid to precipitate unreacted p,p'-isopropylidenediphenol. After adding 500 parts of hot water and adjusting the temperature to 90° C., 189 parts of chloroacetic acid dissolved in 300 parts of water containing 80 parts of caustic soda was added. The temperature was raised to 80° C., and additional caustic solution of 80 parts of caustic soda in 150 parts water was added. The reaction mixture was heated to 95–100° C. and held for 1 hour, after which the aqueous layer was removed by decantation. To the agitated resinous product was added 1,000 parts of hot water and 120 parts of 37% hydrochloric acid, after which the stirring was continued at 95° C. for 45 minutes. The aqueous layer was then removed by decantation, and the resin washed three times using 2,000 parts hot water for each wash. The resin was finally dried by heating with continued agitation to 130° C. to give 841 parts of a product having a softening point 87° C., an acid value of 57, an alcoholic hydroxyl value of 110, and a phenolic hydroxyl value of 103.

Example III

A portion of 256 parts of p,p'-isopropylidenedi-o-cresol was added to a solution of 40 parts of caustic soda in 300 parts of water and the temperature of the solution raised to 65° C. when 37 parts of epichlorhydrin was added. The temperature was raised to 95° C. and held for 90 minutes when a solution of 94.5 parts of chloroacetic acid and 80 parts of caustic soda in 200 parts of water was added. The mixture was held at 95° C. for 90 minutes and then 14 parts of epichlorhydrin was added and the temperature maintained at 95° C. for 80 minutes when 120 parts of 37% hydrochloric acid was added and stirring continued for 30 minutes. The aqueous layer was decanted and the product was washed three times by stirring 30 minutes with 500 parts of hot water, decanting the aqueous layer each time. The product was dried by heating to 130° C., giving 327 parts of resin having a softening point of 90° C. and an acid value of 89.

Example IV

A portion of 228 parts of p,p'-isopropylidenediphenol was added to a solution of 40 parts of caustic soda in 529 parts of water and the temperature of the solution raised to 65° C. when 37 parts of epichlorhydrin was added. The temperature was raised to 95° C. and held for 75 minutes when a solution of 108 parts of alpha-chloropropionic acid and 80 parts of caustic soda in 240 parts of water was added. The mixture was held at 95° C. for 70 minutes and then 14 parts of epichlorhydrin was added and the temperature maintained at 95° C. for 70 minutes when 180 parts of 37% hydrochloric acid was added and stirring continued for 15 minutes. The aqueous layer was decanted and the product was washed 5 times by stirring 30 minutes with 500 parts of hot water, decanting the aqueous layer each time. The product was dried by heating to 145° C., giving 280 parts of resin having a softening point of 81° C. and an acid value of 80.

Example V

A portion of 1140 parts of p,p'-isopropylidenediphenol was dissolved in 1500 parts of water containing 200 parts of caustic soda and 358 parts of bis(beta-chloroethyl) ether and the reaction mixture raised to 150° C. and held at this temperature for 8 hours (a closed pressure reactor provided with agitation was required for this preparation). After the mixture had cooled to 98° C., the water layer was removed by decantation and the product washed three times with hot water in the usual manner. This intermediate resinous product was dried by heating to 120° C., to give 1235 parts of a hard brittle resin. To 526 parts of this resin dissolved in 600 parts of water containing 80 parts of caustic soda and at a temperature of 98° C. was added 189 parts of chloroacetic acid dissolved in 500 parts of water containing 120 parts of caustic soda. The reaction mixture was continually agitated for 1 hour and 50 minutes at 95° C. The alkaline reaction mixture was then neutralized with dilute hydrochloric acid and washed in the usual manner to give a product having a softening point of 63° C., an acid value of 84, an alcoholic hydroxyl value of 20, and a phenolic hydroxyl value of 114.

Example VI

To 228 parts of p,p'-isopropylidenediphenol dissolved in 350 parts of water containing 40 parts of caustic soda was added with continuous agitation 62 parts of 1,4-dichlorobutene-2 at 69° C., and the reaction mixture raised to approximately 88° C. at which time 75 parts of water containing 40 parts of caustic soda was added and the temperature raised to 95° C. and held at this temperature for 1 hour. A solution of 94 parts of chloroacetic acid and 80 parts of caustic soda dissolved in 400 parts of water was added and the mixture held at 95° C. for 1 hour. To the reaction mixture was added 7.8 parts of 1,4-dichlorobutene-2, and the reaction mixture held at 95° C. for an additional hour. The reaction mixture was neutralized with dilute hydrochloric acid and washed in the usual manner to give 270 parts of a resinous product having a softening point of 68° C. and an acid value of 64.

*Example VII*

In a caustic solution containing 53 parts caustic soda and 402 parts water was dissolved 297 parts of p,p'-isopropylidenediphenol. To this agitated mixture was added 49 parts of epichlorhydrin at 70° C., and the reaction mixture raised to approximately 95° C., holding this temperature for 45 minutes after the addition of epichlorhydrin. A solution of 90 parts chloroacetic acid and 38 parts caustic soda in 288 parts water was added, and the mixture held at 95° C. for 45 minutes. To the reaction mixture was added 18 parts epichlorhydrin, and the reaction mixture was held at 95° C. for an additional 45 minutes at which time 104 parts 93% sulfuric acid which had been diluted with 292 parts water was added and stirring was continued for 45 minutes at 95° C., after which the aqueous layer was removed by decantation. The product was washed three times with hot water. To the resinous product was added 130 parts of borax dissolved in 625 parts of water. The reaction temperature was adjusted to 85° C. and agitation continued for 15 minutes, resulting in solution of the resin to give 1800 parts of a product having approximately 25% non-volatile content. A small sample of the product, taken after the three washings with hot water and before the addition of borax, was dried by heating to 130° C. This resin had a softening point of 78° C., an acid value of 94, an alcoholic hydroxyl value of 97, and a phenolic hydroxyl value of 79.

Six batches of resinous aryloxy acids prepared in accordance with Example VII gave the following constants:

| Example | Alcoholic OH | Phenolic OH | Acid Value |
| --- | --- | --- | --- |
| VIII | 99 | 78 | 100 |
| IX | 97 | 79 | 98 |
| X | 91 | 91 | 96 |
| XI | 92 | 91 | 97 |
| XII | 85 | 96 | 96 |
| XIII | 86 | 90 | 99 |

All of the resinous products of the examples were readily soluble in alkali such as borax or ammonia solutions. The type of alkali used depends upon the specific formulation desired. Alkaline materials which have been found advantageous in formulating coating compositions include borax, ammonia, amines and caustic soda. A convenient method of dissolving the resinous oxyacids is to add the aqueous alkali after the last step in preparing the resin, i.e., following the washing with hot water, so that the resin is still in the molten state. This method is illustrated in Example VII. Where the resin has been freed from water after its preparation and washing, and has been allowed to cool to room temperature, it is preferred that it be pulverized before the addition of the hot aqueous alkali. Solutions of the phenoxy mono-acids prepared in this manner have been found to be stable during storage for prolonged periods.

The resinous aryloxy monoacids herein described are completely miscible with shellac and are often desirably used therewith in the formulation of self-polishing protective coatings. The oxyacids may be conveniently blended with shellac by dissolving both materials simultaneously in aqueous alkali solution, or the aqueous alkali solutions of each of these materials may be made individually and introduced together in the product formulation.

The resinous aryloxy monoacids are conveniently blended with wax emulsions by first preparing the alkali solutions of the former and mixing directly with wax emulsions in the product formulation.

It is sometimes desirable to use certain resins other than shellac along with resinous aryloxy monoacids in the formulation of self-polishing protective coatings. Such resins are illustrated by the ester gum and terpene phenolic types which are sufficiently miscible with waxes so that they may be introduced into the final formulations.

In the following examples, illustrating the preparation of typical non-permanent type coating compositions, the expressed proportions are by weight:

*Example XIV*

An alkali solution of shellac for use with the resins of this invention was prepared by adding 25.7 parts of shellac to a continuously stirred solution containing 68.7 parts of water and 5.6 parts of borax at 60 to 65° C. Sufficient water was subsequently added to give a non-volatile content of 25%.

A wax emulsion was prepared by adding to a molten mixture of 61.7 parts of oxidized microcrystalline wax and 26.5 parts of a terpene phenolic resin (softening point 150–160° C.) at 150° C., 11.8 parts of oleic acid and thoroughly mixing the resulting composition. To this mixture at 105–110° C. was added 4 parts of triethanolamine and 5 parts of 48% caustic soda, and the temperature of 105–110° C. was held, with intermittent stirring, for 15 minutes. This mixture was then poured in a slow, steady stream into 745 parts of water at 94–98° C. with rapid agitation to give an emulsion (12.5% non-volatile) which was then rapidly cooled to 28° C. or less.

A self-polishing floor finish was obtained by mixing 25 parts of the resin composition of Example VII with 25 parts of the shellac solution described above, 50 parts of water, and 28.2 parts of the wax emulsion prepared as described.

*Example XV*

To 131 parts of water heated to 75° C. was added 18.7 parts of the resin prepared in accordance with Example II and 2.7 parts of 28% ammonia. The resulting mixture was stirred until a clear solution was obtained. A self-polishing floor finish was obtained by mixing this solution with 42 parts of the wax emulsion prepared in the manner described in Example XIV.

*Example XVI*

A wax emulsion was prepared by adding 4.8 parts of oleic acid to 45 parts of melted carnauba wax and adjusting the temperature to 105° C.; 5.1 parts of triethanolamine and 3 parts of 30% caustic soda were then added and the mixture was maintained at 105 to 110° C. for 15 minutes with intermittent stirring. This mixture was added in a slow stream to 306 parts of water at 94–98° C. with rapid agitation. After the addition was complete, the emulsion was rapidly cooled to less than 28° C. and water was added to provide a non-volatile content of 12.5%.

A self-polishing floor finish was obtained by mixing 42 parts of the above wax emulsion with a solution comprising 131 parts of water, 18.7 parts of the resin described in Example I and 2.7 parts of 28% ammonia.

*Example XVII*

The procedure outlined in Example XVI was repeated except that only 25 parts of the wax emulsion was employed in the final formulation.

In the exemplified compositions, other vegetable waxes may be substituted for carnauba. Such waxes include ouricuri, candelilla and sugar cane wax. The oxidized microcrystalline wax of the examples may be modified by adding paraffin or certain montan waxes.

As shown in the examples, the phenoxy monoacids of this invention may be used to replace shellac in whole or in part and the ratio of the resin or the resin and shellac to the wax emulsion base may vary from 1 to 4 to 9 to 1.

Further, the solids content of the coating composition may be as low as 6% and up to about 20% and provide superior finishes.

The self-polishing compositions illustrated hereinabove provide coatings which give a smooth glossy surface after les sthan 30 minutes drying time at normal temperatures on usual flooring such as linoleum, asphalt tile, vinyl tile, and rubber tile. These coatings may be satisfactorily damp mopped after drying overnight and may be readily removed by mopping with alkaline cleaners.

The subject resins have been found to be particularly advantageous ingredients in formulating products which give floor coatings which have a high degree of water resistance yet may be readily removed by mopping with aqueous alkali cleaners. These resinous oxyacids also contribute to the self-polishing coating unusually good flow characteristics so that the films formed therefrom are glass-like in smoothness, being perfectly free from any pitting or orange peel surface effect. An unusually high gloss is obtained from floor coatings of these materials, and the high gloss is maintained even after several damp moppings. The gloss-contributing characteristics of the resinous aryloxy monoacids are such that high gloss finishes are obtained even when the non-volatile content of self-polishing floor coatings formulated therefrom is as low as 7 or 8%, whereas much higher non-volatile contents are usually required in order to get satisfactory gloss from the conventional self-polishing floor finishes. Selfpolishing floor finishes formulated by blending the resinous oxyacids with waxes are unusually clear and free from haze indicating usually good miscibility of actual dried film constituents and a freedom from forming insoluble film constituents on aging. It has been observed that self-polishing floor coatings, based on the use of blends of these aryloxyacids with other polish ingredients, give films which are unusually free from water spotting which is so common with many commercial non-permanent type floor coating materials.

While there are above disclosed but a limited number of embodiments of the product of the invention herein presented, it is possible to produce still other embodiments without departing from the inventive concept herein disclosed, and it is desired therefore that only such limitations be imposed on the appended claims as are stated therein, or required by the prior art.

I claim:
1. An alkali-soluble resin, said resin comprising the reaction product of (A) the condensation product under alkaline conditions of (1) a dihydric phenol and (2) a coupling agent of 2–10 carbon atoms of the group consisting of halo epoxy aliphatic hydrocarbon, dihalo aliphatic hydrocarbon, diepoxy aliphatic hydrocarbon, and internal ethers of such coupling agents, wherein the epoxy oxygen of said epoxy compounds bridge adjacent carbon atoms, each of said compounds having two, and only two, groups reactive with a phenoxide or phenolic hydroxyl and selected from the group consisting of halo and epoxy, and (b) an aliphatic monocarboxylic acid of the group consisting of epoxy and halo acids of 1–8 carbon atoms, wherein the opoxy oxygen of said epoxy acids bridge adjacent carbon atoms, the reactants (1) and (2) being heated to a temperature sufficient to etherify, the proportions of (1) to (2) being from about 2:1 to 3:2 on a molecular basis; and the reaction of (A) with (B) being conducted in an alkaline medium, proportions of (B) being sufficient to obtain a resin having an acid value in the range of 40–130 and a phenolic hydroxyl value in the range of 40–130, the reaction being conducted under conditions to produce ether linkages bonding the reactants.

2. The product of claim 1 wherein the dihydric phenol is a member of the group consisting of alkyl-substituted and unsubstituted para, para'-alkylene diphenol and para, para'-alkylidene diphenol.

3. The product of claim 2 wherein the coupling agent is a halo epoxy aliphatic hydrocarbon, said resin having alcoholic hydroxyl value within the range of 60–150.

4. The product of claim 2 wherein the coupling agent is a dihalo aliphatic hydrocarbon.

5. The product of claim 2 wherein the coupling agent is a diepoxy aliphatic hydrocarbon.

6. The product of claim 2 wherein the coupling agent is a dihaloaliphatic ether.

7. An alkali soluble resin with the following structure:

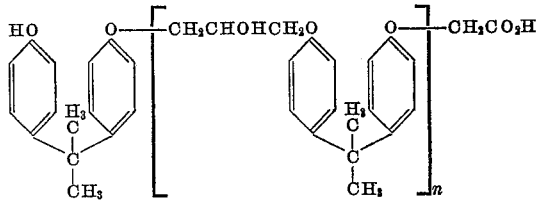

wherein $n$ has a value of 1 to 3.

8. An alkali soluble resin with the following structure:

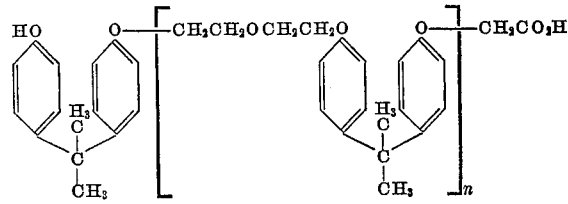

wherein $n$ has a value of 1 to 3.

References Cited in the file of this patent
UNITED STATES PATENTS

| | | |
|---|---|---|
| 2,569,920 | Buck et al. | Oct. 2, 1951 |
| 2,602,075 | Carpenter et al. | July 1, 1952 |
| 2,659,753 | Plump | Nov. 17, 1953 |

FOREIGN PATENTS

| | | |
|---|---|---|
| 652,030 | Great Britain | Apr. 11, 1951 |

OTHER REFERENCES

Noeller: "Chemistry of Organic Compounds," 1951, W. B. Saunders Co., Philadelphia, Pa., page 718.